United States Patent
Davidsson et al.

[19]

[11] Patent Number: 6,162,119

[45] Date of Patent: Dec. 19, 2000

[54] DEVICE FOR REGULATION OF INTAKE AIR IN A VEHICLE

[75] Inventors: Staffan Davidsson, Göteborg; Adolf Kascha, Trosa, both of Sweden

[73] Assignee: Scania CV Aktiebolag, Sweden

[21] Appl. No.: 09/367,888

[22] PCT Filed: Dec. 21, 1998

[86] PCT No.: PCT/SE98/02403

§ 371 Date: Oct. 26, 1999

§ 102(e) Date: Oct. 26, 1999

[87] PCT Pub. No.: WO99/34994

PCT Pub. Date: Jul. 15, 1999

[30] Foreign Application Priority Data

Dec. 22, 1997 [SE] Sweden .................................. 9704805

[51] Int. Cl.$^7$ ................................................. B60S 1/54
[52] U.S. Cl. ...................... 454/121; 454/69; 251/251; 251/263; 251/305; 251/294; 251/279
[58] Field of Search ...................... 454/121, 69; 251/251, 251/263, 305, 294, 279

[56] References Cited

U.S. PATENT DOCUMENTS

| | | | |
|---|---|---|---|
| 4,936,159 | 6/1990 | Kallio | 74/501.5 R |
| 5,797,585 | 8/1998 | Auvity | 251/80 |

FOREIGN PATENT DOCUMENTS 2212587  7/1989  United Kingdom .

*Primary Examiner*—Denise L. Ferensic
*Assistant Examiner*—Jiping Lu
*Attorney, Agent, or Firm*—Ostrolenk, Faber, Gerb & Soffen, LLP

[57] ABSTRACT

The present invention relates to an apparatus for controlling the supply of intake air to a vehicle, incorporating a control unit which is arranged to indicate and initiate supply of intake air to at least three intake air regions in the vehicle which usually comprise a defroster region, a panel region and a floor region. The apparatus incorporates a control arrangement which is designed, depending on the setting of the control unit, to control dampers (15 A–C) which are situated in ducts which lead to the intake air regions. The control arrangement incorporates a cam arrangement designed to act upon an arm (14 A–C), arranged for each inlet air region, for variable setting of at least one of the dampers (15 A–C) between an open and a closed position. The cam arrangement incorporates at least two movable cam devices (11) which each incorporate an external cam surface (13) with a cam height which varies along the cam surface, and each of the arms (14 A–C) is designed, by means of a contact device (16 A–C), to bear upon and be acted upon by whichever of the cam surfaces (13) of the two cam devices (11) exhibits the larger cam height in the region of the contact device (16 A–C).

19 Claims, 2 Drawing Sheets

DEVICE FOR REGULATION OF INTAKE AIR IN A VEHICLE

BACKGROUND TO THE INVENTION AND STATE OF THE ART

The invention relates to an arrangement for controlling the supply of inlet air to a vehicle. The arrangement incorporates a control unit arranged to indicate and initiate supply of intake air to at least three intake air regions in the vehicle, and a control arrangement which is designed depending on the setting of the control unit, to control dampers situated in ducts which lead to said intake air regions. This control arrangement incorporates a cam arrangement which is designed to control an arm, arranged for each intake air region, for variable setting of at least one of said dampers between an open and a closed position.

Ventilation arrangements in vehicles which supply intake air to three intake air regions, which in a vehicle are usually a defroster region, a panel region and a floor region, are commonly subject to the limitation that the intake air cannot be distributed simultaneously, and in desired quantities, to said intake air regions.

A known ventilation arrangement according to GB 2 212 587 B incorporates a rotatable control unit arranged to initiate and supply intake air to three intake air regions. That control unit can only distribute intake air to at most two regions simultaneously. The rotary motion of the control unit is transmitted via a cable to a control arrangement which incorporates a cam arrangement for controlling arms which incorporate dampers for said intake air regions. This cam arrangement incorporates a cam device with three recesses for controlling the respective arms. This form of cam arrangement does not make it possible to eliminate the aforesaid limitation.

Another known ventilation arrangement supplying intake air to said three intake air regions in a vehicle uses three separate control devices, one for each intake air region. Each of these three control devices is moved individually along its separate path and separately controls its control arrangement in order to distribute intake air to the respective region. This control unit makes it possible for intake air to be supplied entirely variably to said intake air regions. It has disadvantages in that it occupies a large amount of space on the instrument panel and involves three separate control arrangements.

In heavy-duty vehicles it is often desirable to keep down the number of electronically controlled components, so the present invention relates to a mechanical arrangement for controlling the intake air supply in the vehicle.

SUMMARY OF THE INVENTION

The object of the present invention is to provide, for supplying intake air to a vehicle, an arrangement of the kind mentioned in the introduction which makes it possible for intake air to be supplied simultaneously with a desired distribution to said three intake air regions.

This object is achieved by the arrangement in the vechile housing indicated in the introduction which is characterised in that the cam arrangement incorporates at least two movable cam devices each incorporating an external cam surface with a cam height which varies along the cam surface, while each of said arms is designed, via a contact device, to bear upon and be acted upon by whichever of the cam surfaces of the two cam devices exhibits the greater cam height in the region of the contact device. The fact that two movable cam devices are used thus makes it possible to supply and distribute intake air to three different intake air regions in any desired manner.

According to an advantageous embodiment of the invention, said cam devices are substantially identical in form and movable independently of one another. At the same time, it may for reasons of space be practical for said cam devices to be arranged to be rotatable about a common spindle. The cam devices may also consist of two cam discs arranged in parallel.

According to a further advantageous embodiment of the invention, each of the arms is arranged so that, via the contact device, it bears flexibly on said cam surface. This enables the contact device to be raised from whichever of the cam surfaces of the cam device has the smaller cam height, while at the same time the contact device will only bear upon and be acted upon by whichever cam device exhibits the greater cam height in the region of the contact device. This flexibility of the arms while a simultaneous force bears upon the cam surfaces may be achieved by the arms being arranged to bear resiliently upon said cam surface via spring devices. Such spring devices may be suitably arranged to extend between the arms and the cam arrangement, preferably with a first end of such a spring device being arranged on one of the arms in the vicinity of the latter's contact device, and another end being arranged on the spindle of the cam device.

According to one embodiment of the invention, the contact devices extend across the surface of each cam device substantially transverse to the direction of movement of the cam devices. At the same time, the contact device may take the form of a steel element extending between said two cam devices. Low-friction contact between the contact device and the cam surface may be achieved by the contact device incorporating a roller device. Alternatively, the contact device may incorporate a material or coating with such characteristics as to slide rather frictionlessly over said cam surface.

According to a further embodiment of the invention, each of said arms incorporates first and second end portions and the contact device is arranged between these end portions. At least one out of the first and second end portions of the arms may in that case be connected to a damperer variable setting of the latter. As intake air is usually supplied via at least two intake air ducts to each intake air region, e.g. to the right and to the left of the panel region, two dampers may in that case be controlled synchronously by the same arm.

According to an advantageous embodiment of the invention, said control unit incorporates separate control devices for operating the respective cam devices. This means that the respective cam devices can be controlled and set individually to achieve a desired intake air supply.

DETAILED DESCRIPTION OF A PREFERRED EMBODIMENT OF THE INVENTION

Figure 1:
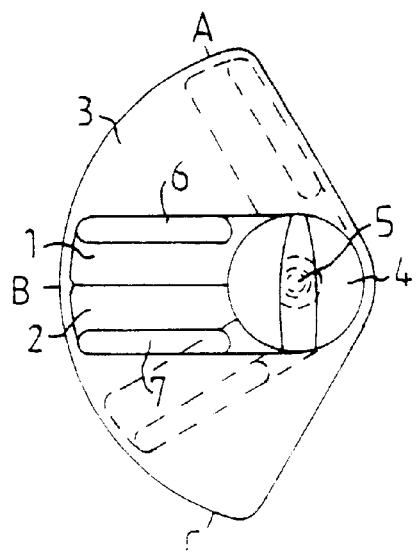
FIG. 1 shows a control unit suitable for initiating the operation of a control arrangement according to the invention.
Figure 2:
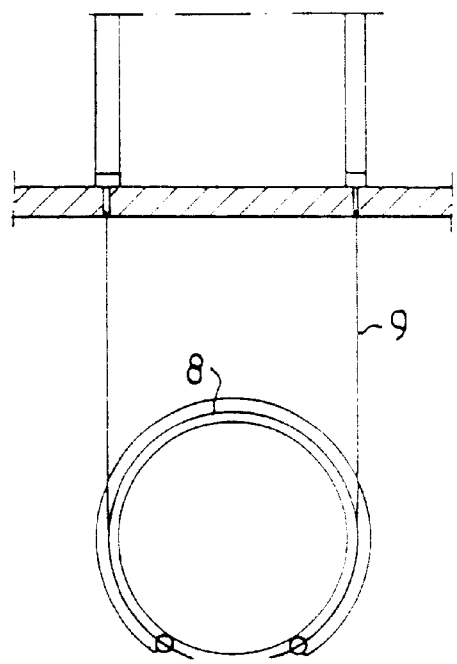
FIG. 2 shows a cable device for transmitting rotary motion of the control unit in FIG. 1.

FIG. 1 depicts a control unit for a ventilation arrangement in a vehicle. The control unit incorporates a first control device 1 and a second control device air which are designed to indicate and initiate the supply of an air flow to three intake air regions, also simply called regions in the vehicle, viz. a defroster region, a panel region and a floor region. The first control device 1 and the second control device air are movable along the path 3 which takes the form of a substantially arcuate section.

Three indicating positions A, B, C are marked along the extent of said path 3, each for its respective intake air region. These indicating positions A, B, C along the path 3 represent the locations of the intake air regions in a vertical direction of the vehicle so that indicating position A corresponds to intake air to the defroster region, indicating position B corresponds to intake air to the panel region and indicating position C corresponds to intake air to the floor region. This enables the driver to understand naturally and intuitively how to operate the control devices 1, 2 in order to achieve a desired distribution of intake air to the respective regions.

Moving the two control devices 1, 2 to the upper indicating position A will cause all the air to be directed to the defroster region of the vehicle. Correspondingly, placing the two control devices 1, air in indicating position B will cause all the intake air to be supplied to the panel region, and placing the two control devices 1, 2 in indicating position C will cause all the intake air to be supplied to the floor region.

An advantage of having two control devices 1, 2 as compared with having only one is that they make it possible to distribute intake air to two non-adjacent indicating regions, thus intake air can be supplied to the defroster region and the floor region, which is not possible with only one control device. Such a distribution is achieved by moving the first control device 1 to indicating position A and the second control device 2 to indicating position C.

The two control devices 1, 2 can also be used to distribute the intake air to the three intake regions in such a way that the three intake air regions simultaneously receive a certain quantity of intake air. This is achieved by placing the first control device 1 with a first distribution of the intake air between indicating positions A and B, while at the same time placing the second control device 2 with a second distribution of the intake air between indicating positions B and C.

The distribution of the quantities of intake air between the three intake air regions is determined by the spacing at which the control devices 1, 2 are placed relative to the respective indicating positions A–C. If in this case the first control device 1 is placed midway between indicating positions A and B, and the second control device 2 is placed midway between indicating positions B and C, the air flow will be distributed entirely equally between the three intake air regions.

To vary the total intake air quantity, the control unit includes a knob 4 for adjusting an intake air fan. The knob 4 is arranged to rotate about a spindle 5 about which the control devices 1, 2 are also rotatable. The control unit thus assumes a compact form which makes it easy for is the hand to move from the control devices 1, 2 to the knob 4. Adjacent to the control unit there may also be a control device for adjusting the temperature of the intake air supplied.

Each of the first and second control devices 1, 2 exhibits a manual gripping part which incorporates a Long and narrow section 6, 7 which extends substantially perpendicular relative to the extent of the arcuate path 3. This means that the long and narrow sections 6, 7 will, depending on their position along the path, point in a significant direction outwards from the spindle 5. This enables a driver to use his hand to detect the direction of pointing and hence perceive how the intake air is distributed between the three intake air regions, without having to shift his gaze from surrounding traffic when operating the control unit on the instrument panel.

For the initiating of intake air supply to said three intake air regions in the vehicle, each of the control devices 1, 2 is firmly arranged on its respective rotatable pulley 8 on which a cable 9 is arranged for transmitting the rotary motion of the respective control device 1, 2 to a control arrangement which is designed to supply intake air to the respective intake air regions according to the respective setting of the control devices 1, 2.

Figure 3:
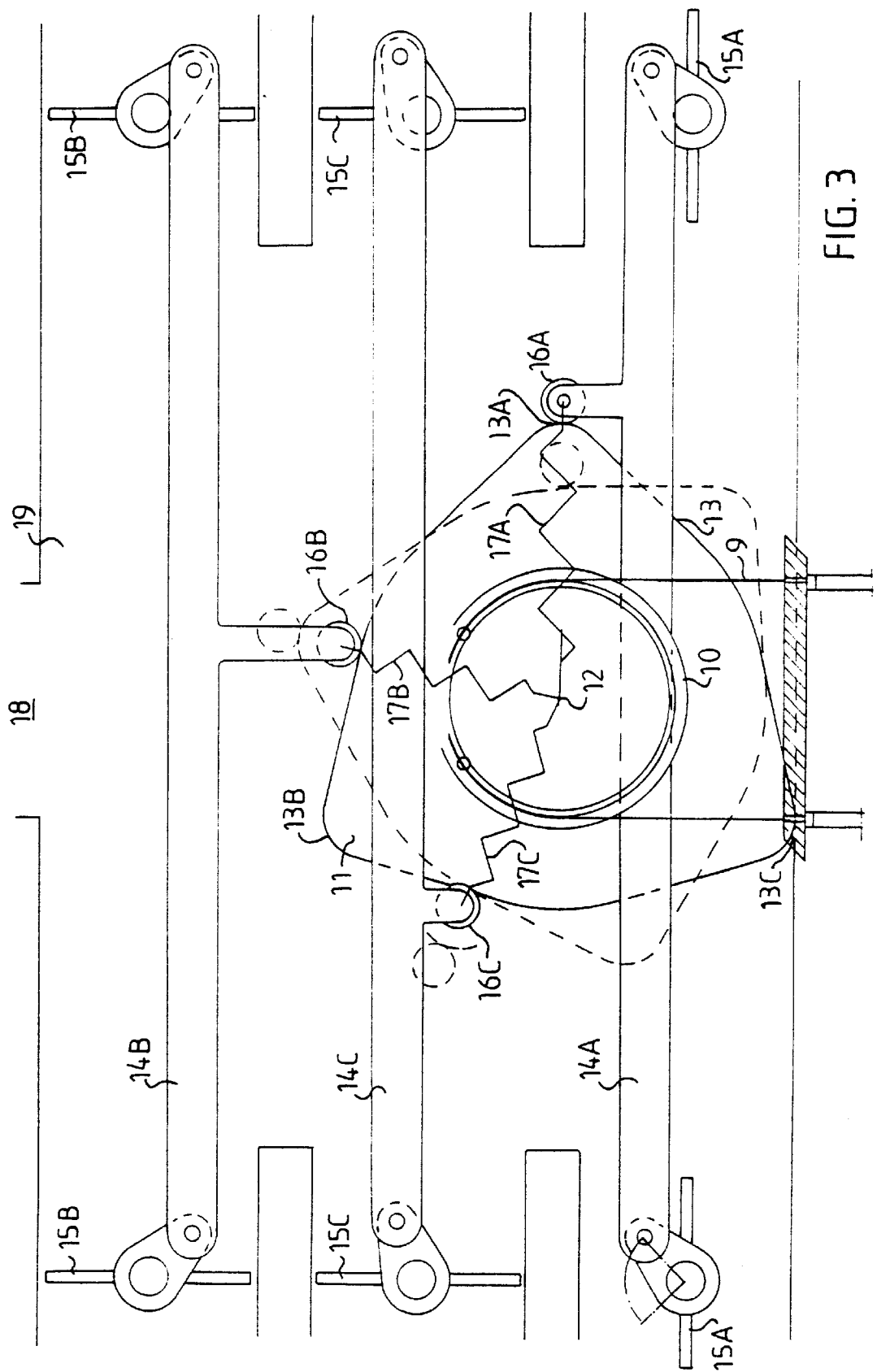
FIG. 3 shows a control arrangement according to the invention for supplying air to three intake air regions in a vehicle.

FIG. 3 depicts this control arrangement but only shows one cable 9 for transmitting the setting of one control device 1, 2 to the control arrangement, although each control device 1, 2 incorporates a cable 9 for initiating operation of the control arrangement. Each cable 9 runs over a pulley 10 in the control arrangement for rotation of the pulley 10 together with a cam device 11 coupled to the pulley. Each of the control devices 1, 2 is thus designed to operate, independently of the other, its cam device 11. The cam devices 11 consist of two parallel identical cam discs or cams which are thus each rotatable by its cable 9 about a common spindle 12. Each cam device 11 incorporates external cam surfaces 13 configured with a varying cam height from the spindle 12. The cam devices 11 are each designed to act upon arms 14 A–C (each arranged for its intake air region) in order, as the cam moves from its highest to its lowest heights or positions to vary the setting of dampers 15 A–C between open and closed positions. Each arm 14 A–C incorporates a roller device or cam follower 16 A–C designed to bear upon and be acted upon by whichever of the two cam surfaces 13 of the two cam devices 11 displays the greater cam height in the region of the roller device 16 A–C. Each arm 14 A–C being flexibly arranged in the cam height direction and the roller devices 16 A–C incorporating a steel roller and being designed to extend across the two cam devices 11 results in each roller device 16 A–C being in contact with whichever cam surface 13 of the cam devices 1, 2 exhibits the greater cam height in the region of the roller device 16 A–C. The arms 14 A–C incorporate first and second end or spaced apart parts portions between which the roller devices 16 A–C are arranged. Both end portions of the arms 14 A–C are connected to the dampers 15 A–C in order to vary the latter's setting. The number of dampers 15 A–C is in this case two per intake air region but may be varied depending, for example, on how many points intake air is supplied to in the respective region. The arms 14 A–C are each resiliently urged towards the cam surfaces 13 of the cam devices 11 by their respective spring device 17 A–C arranged between each of said arms 14 A–C (in the vicinity of the respective roller device 16 A–C) and the cam device's spindle 12. Air is supplied via a duct 18 to a damper housing 19 in which the control arrangement described above is arranged.

Each control device 1 and air (see FIG. 1) is rotatable for about 120° along the arcuate path 3. This rotary motion is transmitted by the cable 9 to the respective cam device 11, which is also rotatable approximately 120°. The cam surface 13 of each cam device 11 exhibits three tips 13 A–C distributed at mutual spacing of about 120° along the cam surface 13.

When a roller device 16 A–C is situated on one of these tips 13 A–C, the respective arm 14 A–C is designed to open the respective damper 15 A–C to the maximum extent. This takes place when the control devices 1, 2 are arranged in one of the indicating positions A, B or C. When the control arrangement is set as depicted in FIG. 3, roller device 16 A is situated on tip 13 A of the cam surface so that damper 15 A is fully open, while roller devices 16 B, C are situated along the cam surface 13 where the cam height is at a minimum, so that dampers 15 B, C are fully closed.

If thereafter the control devices 1, 2 are together moved from the depicted indicating position A to indicating position B, roller 16 A will follow the cam surface 13 of the cam device 11, the cam height of which will thus progressively decrease, i.e. the distance of the cam surface 13 from the cam device's spindle 12 will decrease, while at the same time arm 14 A progressively closes damper 15 A. During this process, roller device 16 B will move along the cam surface 13 of the cam device 11, the cam height of which will thus progressively increase until the control devices 1, 2 have reached indicating position B, at which roller device 16 B is situated on cam surface tip 13 B and damper 15 B is fully open. This position is indicated by chain-dotted lines in FIG. 3.

During the movement of control devices 1, 2 between indicating positions A and B, roller device 16 C will move along a region of the cam surface 13 which exhibits a constant minimum cam height so that damper 15 C is closed throughout this process. Continuing joint movement of the control devices 1, 2 from indicating position B to indicating position C will cause roller device 16 A to move over a cam surface 13 with a constant minimum cam height so that damper 15 A in this region is fully closed. During that movement of the control devices 1,2, roller device 16 B will move from its maximum cam height value 13 B along a cam surface 13 with a progressively decreasing cam height until indicating position C, at which damper 15 B is fully closed, is reached. During said movement of the control devices 1,2, roller device 16 C will move along a cam surface with a progressively increasing cam height until maximum cam height is reached at position 13 C at which damper 15 C is fully open.

The intake air control described above achieved by simultaneous movement of the two control devices 1, air along a path 3 has the same effect as moving a single controlling device according to the prior art. The fact that the present invention incorporates two control devices 1, 2 and respective cam devices 11 coupled to them means that said control of the intake air flow to said three intake air regions takes place in such a way that the intake air can be distributed to all three regions simultaneously and with the desired distribution. The fact that each roller device 16 A–C is flexibly arranged in the cam height direction and extends rigidly between the two cam devices 1, 2 means that the respective roller device 16 A–C will be acted upon by cam surfaces 13 of whichever of the two cam devices 11 exhibits the greater cam height in the region of the respective roller device A–C.

If for example the first control device 1 is placed in indicating position A while the second control device 2 is placed in indicating position C, roller device 16 A will thus be at its maximum cam height on surface 13 A of the first cam device 11, while roller device 16 C will be at its maximum cam height on surface 13 C of the second cam device 11. The two dampers 16 A, 16 C will therefore be open to the maximum extent. The fact that the two cam devices at indicating positions A and C exhibit their minimum cam height means that roller device 16 B will lead to damper 15 B being fully closed. The air supplied via the duct 18 to the damper housing 19 will therefore be distributed equally to the intake air regions with indicating positions A and C, i.e. the defroster region and the floor region.

Intake air supply to all three intake air regions simultaneously is achieved by the first control device 1 being placed in the region between indicating positions A and B while the second control device 2 is placed in the region between indicating positions B and C. This will cause the air to be distributed to the various intake air regions simultaneously, with the distribution to the respective intake air regions being determined by the spacing between the control devices 1, 2 and the respective indicating positions A, B, C. The air is distributed equally to all three intake air regions if the first control device 1 is placed exactly between indicating positions A and B while the second control device 2 is placed exactly between indicating positions B and C.

The invention is in no way limited to the embodiment described above but may be varied within the scope of the patent claims.

What is claimed is:

1. Apparatus in a vehicle housing for controlling distribution of a supply of intake air in said vehicle to separate first, second and third regions of said vehicle, each of said regions including a duct communicating said supply of intake air to said region, a damper mounted in said duct and movable between open and closed positions, and an arm having a first part coupled to said damper for moving it between said open and closed positions and a second part spaced from said first part, said ducts for said first, second and third regions comprising a first set of ducts, said apparatus comprising a housing, first and second cams, each rotatably mounted in said housing about a central spindle, means for rotating each of said cams, said first cam having three separate cam surfaces which vary in height relative to its central spindle, each of said arms having at its second part a cam follower coupled to one of said three cam surfaces, said cam surfaces of said first cam configured to open or close the damper for any one or more of said regions, said second cam configured substantially the same as said first cam and operable to drive said arms coupled to said dampers for said three regions the same as and independently of said first cam, such that said second cam can cause opening or closing of the same or different dampers or combination of said dampers as said first cam.

2. Apparatus according to claim 1, wherein said cams are substantially identical in form.

3. Apparatus according to claim 1, wherein said cams are rotatable about a common spindle.

4. Apparatus according to claim 1 further comprising a spring urging each of said cam followers into engagement with one of said cam surfaces, and where each of said arms moves an amount corresponding to the varying height of the cam surface to which it is coupled.

5. Apparatus according to claim 1, wherein each of said arms bears flexibly upon one of said cam surfaces.

6. Apparatus according to claim 1, wherein either of said cams cannot close a damper when the other cam has opened it.

7. Apparatus according to claim 1, wherein each of cam followers extends across the cam surfaces of said two cams substantially transverse to the direction of movement of said cams.

8. Apparatus according to claim 1 wherein each of said followers comprise a roller device.

9. Apparatus according to claim 1 wherein said vehicle further comprises a second set of ducts from said supply of intake air to said first, second and third regions respectively and a damper in each duct of said second set of ducts, and wherein each of said arms further comprises a third part spaced from said first and second parts, each of said third parts coupled to said damper in one of said second set of ducts similarly as each of said first parts of each arm is coupled to a damper in a duct of said first set of ducts, whereby any of said cam surfaces causing opening of a damper in any of said first set of ducts simultaneously causes opening of the damper in the second duct to the same region.

10. Apparatus according to claim 9 wherein at least one of said second and third parts of each of said arms is connected to a damper for variable setting of said damper.

11. Apparatus according to claim 9 wherein said first part of each of said arms is between said second and third parts.

12. Apparatus according to claim 1 further comprising separate control devices respectively, each of said control devices coupled to one of said cams to rotate said cam and to indicate its position by its amount of rotation.

13. Apparatus according to claim 12 wherein each of said control devices comprises a knob coupled to one of said cams and rotatable about an arcuate path, and wherein each of said knobs includes a gripping part that extends substantially perpendicular to the extent of said arcuate path.

14. Apparatus according to claim 12 wherein each of said cams is rotatably mounted about its own spindle.

15. Apparatus according to claim 1 wherein said three regions comprise the defroster, the panel and the floor, and wherein said first cam distributes selectively to said defroster and panel regions, and said second cam distributes selectively to said panel and floor regions.

16. Apparatus according to claim 1 wherein each of said cams is configured to control the dampers in ducts for two of said regions.

17. Apparatus according to claim 16 wherein said first cam controls said dampers for said first and second regions, and said second cam controls said dampers for said second and third regions.

18. In a vehicle housing an apparatus for controlling distribution of a supply of intake air in said vehicle to separate first, second and third regions of said vehicle, each of said regions including a duct communicating said supply intake air to said regions, a damper mounted in said duct and movable between open and closed position, an arm having a first part coupled to said damper for moving said damper between its open and closed positions and a second part spaced from said first part, said ducts for said first, second and third regions comprising a first set of ducts, the improvement comprising first and second cams, each rotatably mounted in said housing about a central spindle to vary the position of the damper to which it is coupled, means for rotating of said cams, said first cam having three separate cam surfaces which vary in height relative to its central spindle, each of said arms having at its second part a cam follower coupled to one of said three cam surfaces, said cam surfaces of said first cam configured to open or close the damper for one or more of said regions, said second cam configured substantially the same as said first cam and operable to drive said aims coupled to said damper for said three regions the same as and independently of said first cam, such that said second cam can cause opening or closing of the same or different dampers or combination of said dampers as said first cam.

19. Apparatus in a vehicle housing for controlling distribution of a supply of intake air in said vehicle to separate first, second and third regions of said vehicle, each of said regions including a duct communicating said supply of intake air to said region, a damper mounted in said duct and movable between open and closed positions, and an arm having a first part coupled to said damper for moving it between said open and closed positions and a second part spaced from said first part, said apparatus comprising first and second cams mounted in said housing, each movable between its highest and its lowest positions to vary the position of the damper to which it is coupled, means for moving each of said cams between said highest and lowest positions, said first cam having three separate cam surfaces which vary in height relative to its lowest position, each of said arms having at its second part a cam follower coupled to one of said three cam surfaces, said cam surfaces of said first cam configured to open or close the damper for any one or more of said regions, said second cam configured to drive said arms coupled to said damper for said three regions the same as and independently of said first cam, such that said second cam can cause opening or closing of the same or different dampers or combination of dampers or said first cam.

* * * * *